(12) United States Patent
Anantharaman et al.

(10) Patent No.: US 8,455,133 B2
(45) Date of Patent: Jun. 4, 2013

(54) BATTERY PACK

(75) Inventors: Satish Anantharaman, Farmington Hills, MI (US); Pradeep Gnanaprakasam, Troy, MI (US); Raghav Sampath Kumar, Lake Charles, LA (US); Raymond E. Chaney, Auburn Hills, MI (US); Jozef Gorog, Troy, MI (US); Nick Karditsas, Lake Orion, MI (US)

(73) Assignee: Cobasys, LLC, Orion, MI (US)

( * ) Notice: Subject to any disclaimer, the term of this patent is extended or adjusted under 35 U.S.C. 154(b) by 798 days.

(21) Appl. No.: 12/321,977

(22) Filed: Jan. 28, 2009

(65) Prior Publication Data

US 2009/0191452 A1 Jul. 30, 2009

Related U.S. Application Data

(60) Provisional application No. 61/062,779, filed on Jan. 29, 2008.

(51) Int. Cl.
*H01M 6/42* (2006.01)

(52) U.S. Cl.
USPC ............................. 429/149; 429/148; 429/153

(58) Field of Classification Search
USPC .......................................... 429/149, 153, 148
See application file for complete search history.

(56) References Cited

U.S. PATENT DOCUMENTS

| | | | |
|---|---|---|---|
| 6,579,642 B2 * | 6/2003 | Yamane et al. | 429/120 |
| 2002/0102454 A1 * | 8/2002 | Zhou et al. | 429/88 |
| 2006/0214633 A1 * | 9/2006 | Cho | 320/112 |

* cited by examiner

*Primary Examiner* — Jane Rhee
(74) *Attorney, Agent, or Firm* — Harness, Dickey & Pierce, P.L.C.

(57) ABSTRACT

Disclosed herein is a multi-cell battery pack having optimal temperature distribution throughout the battery pack and optimal air flow through the battery pack. Disclosed herein is a battery pack which provides optimal temperature distribution throughout the battery pack, wherein maximum cell temperature ($T_{max}$) and temperature differential amongst all cells in the battery pack ($\Delta T_{cell}$) are optimized for efficient thermal management providing safety, improved performance and extended life of the battery pack and electrochemical cells. Also disclosed herein is a battery pack which provides optimal flow through the battery pack and minimal pressure drop ($\Delta P$) throughout the battery pack.

20 Claims, 15 Drawing Sheets

BATTERY PACK

CROSS-REFERENCING TO RELATED APPLICATIONS

This application claims the benefit of U.S. Provisional Application No. 61/062,779, filed on Jan. 29, 2008, which is hereby incorporated herein by reference in its entirety.

FIELD OF THE INVENTION

The instant invention relates generally to improvements in rechargeable high performance batteries, modules and packs. Specifically, the invention relates to multi-cell battery pack having optimal temperature distribution throughout the battery pack and optimal air flow through the battery pack.

BACKGROUND

Rechargeable batteries are used in a variety of industrial and commercial applications such as fork lifts, golf carts, uninterruptible power supplies, pure electric vehicles and hybrid electric vehicles. Vehicular applications include applications related to propulsion as well as applications related to starting, lighting and ignition.

One aspect of battery operation that is particularly important for electric vehicle and hybrid vehicle applications is that of thermal management. In both electric and hybrid vehicle applications individual electrochemical cells are bundled together in close proximity. Many cells are both electrically and thermally coupled together. Therefore, the batteries used in these applications may generate significant heat during operation. Sources of heat are primarily threefold. A first source is ambient heat due to the operation of the vehicle in hot climates. A second source is resistive or $I^2R$ heating on charge and discharge of the cells, wherein I represents the current flowing into or out of the cell and R is the resistance of the cell.

A battery generates Joule's heat and reaction heat due to electrode reaction at charging and discharging operations. A module battery including a series of cells having such a large capacity or a pack battery including a series of the module batteries is configured of several tens to several hundreds of the cells arranged contiguously to each other. The cells, with an increased electric capacity and sealed configuration, increase in the amount of heat accumulation. As a result, heat dissipation out of the battery is retarded and the generated heat is accumulated within the battery.

Efficient thermal management is the key for safety, performance and extended life of battery packs. Battery cells are typically required to be packaged in the available envelop so that maximum temperature of the cells are within specific temperature maximum, with minimal temperature variation amongst the individual cells in the battery pack.

Currently there exists a need in the art for a battery pack that maintains uniform temperature distribution on the cells with optimal minimum peak temperatures, and the least pressure drop associated with the air flow. Minimizing the peak temperature of the cells is important because it increases the life of the cells. Maintaining uniform temperature across the battery is necessary to maintain the pack performance and longevity. The present invention overcomes the deficiencies of prior art using efficient cell packaging and battery pack design so that the temperatures and system pressure drops are within the optimal operational values.

SUMMARY OF THE INVENTION

Disclosed herein is a battery pack which provides optimal temperature distribution throughout the battery pack, wherein maximum cell temperature ($T_{max}$) and temperature differential amongst all cells in the battery pack ($\Delta T_{cell}$) are optimized for efficient thermal management providing safety, improved performance and extended life of the battery pack and electrochemical cells. Preferably, $\Delta T_{cell}$ is less than 5° C. Also disclosed herein is a battery pack which provides optimal flow through the battery pack and minimal pressure drop ($\Delta P$) throughout the battery pack.

An objective of a preferred embodiment of the present invention is to provide a battery pack having a uniform temperature distribution amongst the cells with minimum peak temperatures, and minimal pressure drop associated with the air flow. Minimizing the peak temperature of the cells is also important because it increases the life of the cells. Maintaining uniform temperature across the battery is important to maintain the pack performance and longevity.

Disclosed herein is a battery pack having at least one set of battery assemblies having a plurality of electrochemical cells. In a preferred embodiment, each battery pack comprises a housing having a base and a lid. A first battery assembly is arranged within the housing, wherein the first battery assembly is set upon a first axis forming an angle acute to the base. A second battery assembly is arranged within the housing, wherein the second battery assembly is set upon a second axis forming an angle acute to the lid. A primary cooling cavity is formed between the first and second battery assemblies, wherein the primary cooling cavity is a converging air flow path. The battery pack may further comprise a front wall and a rear wall, wherein a primary air inlet is set into the front wall and at least one air outlet is set into said rear wall. Preferably, the primary air inlet is in flow communication with the primary cooling cavity and the primary cooling cavity comprises a converging air flow path from the front wall to the rear wall. Preferably, the housing further comprising an outlet manifold in flow communication with each of the primary air outlets.

The battery pack may further comprise a first diverging air flow path between the base and the first battery assembly and a second diverging air flow path between the lid and the second battery assembly. At least one secondary air inlet may be set into the front wall. A first assembly air inlet may be in direct flow communication with the first battery assembly and a second assembly air inlet may be in direct flow communication with the second battery assembly. A baffle may be disposed into each of the battery assemblies, wherein each baffle is positioned to regulate air from the secondary air inlets into contact with the electrochemical cells. Preferably, each of the first and second diverging air flow paths is in flow communication with the outlet manifold.

Another embodiment of the present invention discloses a battery pack comprising a first battery assembly and a second battery assembly. The first battery assembly comprises at least one row of electrochemical cells dispersed between a base tray and a lower cavity support and the second battery assembly comprises at least one row of electrochemical cells dispersed between a lid tray and an upper cavity support. Preferably, the first battery assembly and second battery assembly mate to form a primary cooling cavity between the lower cavity support and the upper cavity support, wherein the primary cooling cavity is a converging air flow path. A base may be secured to the base tray forming a first diverging air flow path between the base and the base tray and a lid may be secured to the lid tray forming a second diverging air flow path between the lid and the lid tray.

The battery pack may further comprise the lower cavity support having at least one interior air inlet and the upper cavity support having at least one interior air inlet. As cooling air enters the primary cooling cavity through the primary air inlet, air flows into the first and second battery assemblies via the interior air inlets. The air is forced through the interior air inlets as primary cooling cavity converges toward the rear wall. The cooling air flows through the first battery assembly, through the interior air outlets and into the first diverging air flow path. The cooling air flows through the second battery assembly, through the interior air outlets and into the second diverging air flow path. Preferably, an outlet manifold is in flow communication with each of the first diverging air flow path and the second diverging air flow path, which directs the air flow through the primary air outlet.

Depending of the power needs of a given battery system, additional rows of electrochemical cells may be added by integrating at least one lower mid-support set between the base tray and the lower cavity support and at least one upper mid-support set between the lid tray and the upper cavity support.

Disclosed herein is a battery pack having a uniform temperature distribution on the cells with minimum peak temperatures, and low pressure drop associated with the air flow within the battery pack. Disclosed herein is a battery pack having efficient heat transfer and high temperature cut. Disclosed herein is a battery pack having minimal peak temperature of the cells and uniform temperature across the battery pack to increase the pack performance and maintain longevity.

Disclosed herein is a method for cooling a battery pack having a first and second battery assembly, comprising providing a housing having a front wall, a rear wall, a base and a lid and disposing the first battery assembly within the housing, the first battery assembly set upon a first axis forming an angle acute to the base. The method further includes disposing the second battery assembly arranged within the housing, the second battery assembly set upon a second axis forming an angle acute to the lid, forming a primary cooling cavity between the first and second battery assemblies, forming a primary air inlet in the front wall, the primary air inlet in flow communication with the primary cooling cavity and forming at least one air outlet set into the rear wall, the primary cooling cavity comprising a converging air flow path from the front wall to the rear wall, dispersing a air flow through the primary air inlet into to the primary cooling cavity, converging the cool air flow, wherein the converging accelerates the air flow through the first battery assembly and the second battery assembly.

The method for cooling the battery pack may further comprise forming a first diverging air flow path between the base and the first battery assembly and forming a second diverging air flow path between the lid and the second battery assembly. The method for cooling the battery pack may further comprise forming at least one first assembly air inlet in the front wall, the first assembly air inlet providing air directly to the first battery assembly and forming at least one second assembly air inlet in the front wall, the second assembly air inlet providing air to the second battery assembly. The method for cooling the battery pack may further comprise dispersing at least one row of electrochemical cells into each of the first and second battery assemblies and forming an outlet manifold within the housing, the outlet manifold in flow communication with each of the primary air outlets. The method for cooling the battery pack may further comprise regulating the air flow from the first assembly air inlets into contact with the electrochemical cells of the first battery assembly and regulating the air flow from the second assembly air inlets into contact with the electrochemical cells of the second battery assembly.

BRIEF DESCRIPTION OF THE DRAWINGS

In order to assist in the understanding of the various aspects of the present invention and various embodiments thereof, reference is now made to the appended drawings, in which like reference numerals refer to like elements. The drawings are exemplary only, and should not be construed as limiting the invention.

DETAILED DESCRIPTION OF EMBODIMENTS OF THE INVENTION

Figure 1:
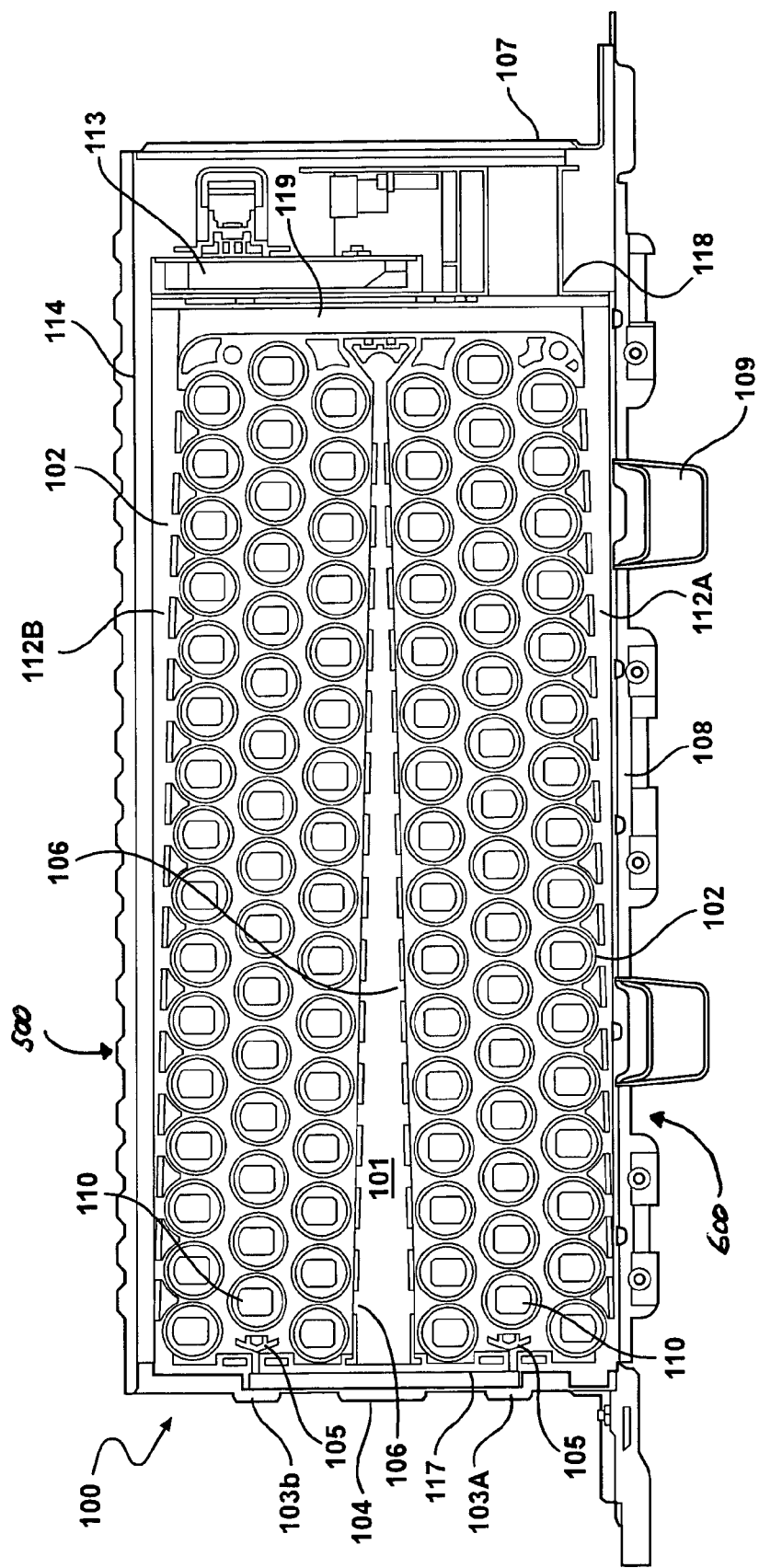
FIG. 1 is a cross sectional side view of an embodiment of a battery pack of the present invention.
Figure 2A:
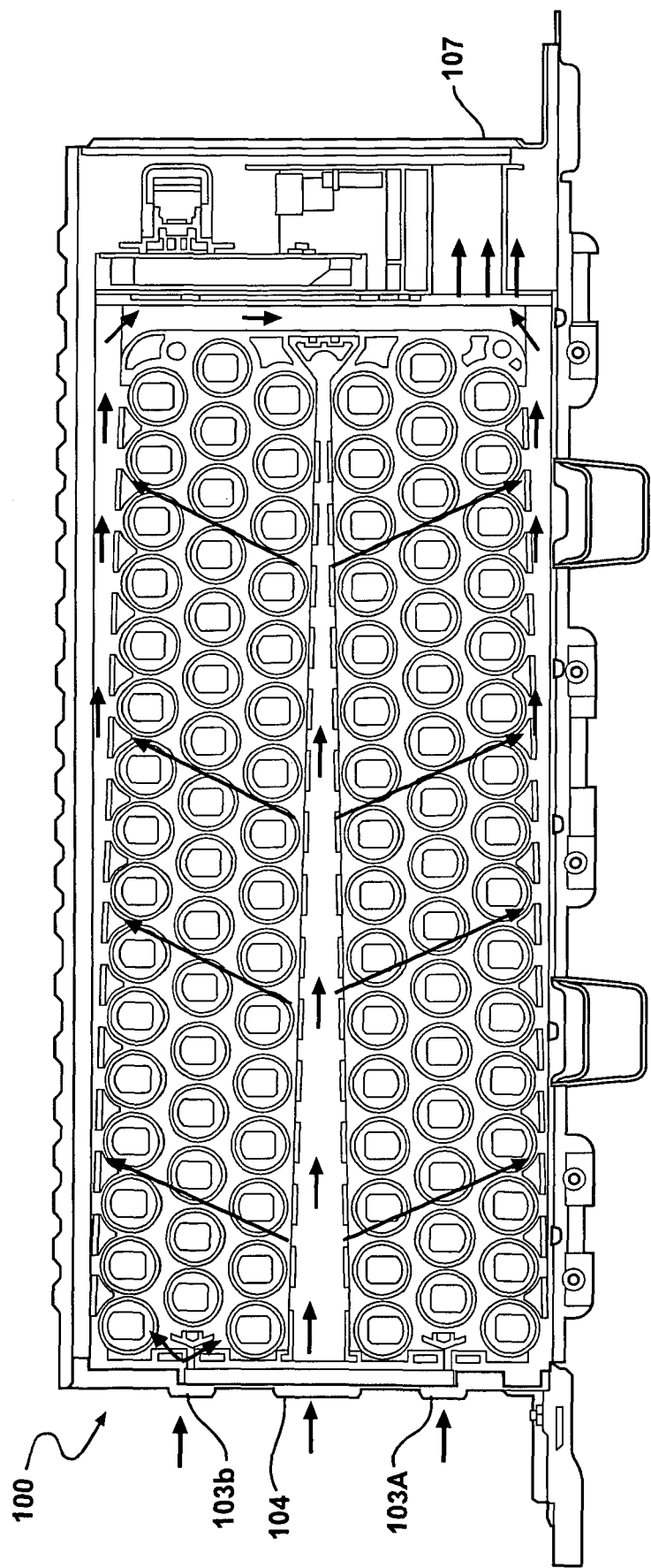
FIG. 2A is a cross sectional side view of an embodiment of a battery pack of the present invention, wherein the preferred air flow paths are illustrated.

The battery pack, generally referred to as 100, described herein provides a housing 111 having a front 117, a rear 118, a base 108 and a lid 114, as illustrated in FIG. 1. A first battery assembly, generally referred to as 500, is arranged within the housing 111 upon a first axis forming an angle acute to the base 108 forming a diverging air flow path 112A between the first battery assembly 500 and the base 108. A second battery assembly, generally referred to as 600, is arranged within the housing 111 upon a second axis forming an angle acute to the lid 114 forming a diverging air flow path 112B between the first battery assembly 600 and the lid 114 and forming a converging path 101, referred to as the primary cooling cavity, between the first and second battery assemblies 500 and 600. Preferably, the electrochemical cells 110 are cylindrical cells positioned perpendicular to the front 117 to rear 118 axis of the battery pack 100. The cell assemblies are preferably arranged in a staggered design as illustrated in FIGS. 1 and 2A. The staggered arrangement allows the air to flow uniformly through the stacks of cells and prevents inhibition of the flow as the coolant winds through the cell stacks from the primary cooling cavity 101 to the exterior cavities 112A and 112B that abut the lid and base, respectively.

Figure 2B:
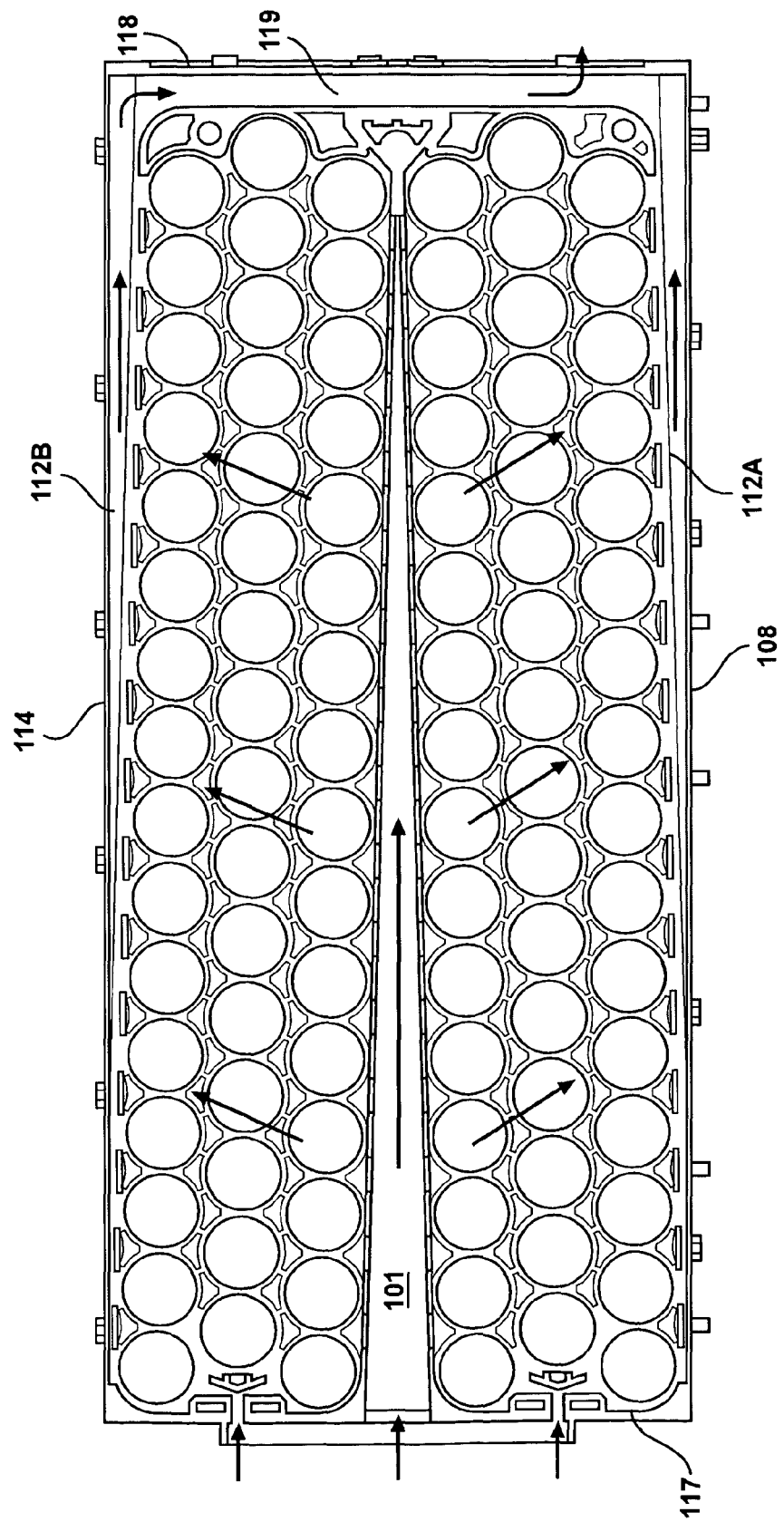
FIG. 2B is a conceptual cross sectional side view of an embodiment of a battery pack of the present invention, wherein the preferred air flow paths are illustrated.

Referring to FIGS. 1, 2A and 2B, the primary cooling cavity 101 decreases in width from the front 117 to the rear 118, which produces a converging air flow path. The battery pack 100 preferably includes at least one primary air inlet 104 set into the front 117 and at least one air outlet 107 set into the rear 118. The primary air inlet 104 provides air to the primary cooling cavity 101, which tapers to a point as air flows from the primary air inlet 101 to the outlet manifold 119. The converging arrangement of the primary cooling cavity 101 ensures that the air flow accelerates as it progresses through the battery pack 100. As a result, in spite of the fact that the air gained heat as it moved from the front 117 to rear 118, the acceleration due to the tapering effect enables efficient cooling of cells at the central and outlet regions of the battery assemblies 500 and 600. The outlet manifold 119 directs the air flow to the air outlet 107. This forces the cool air through the cell assemblies 500 and 600 and allows for the maximum amount of surface area coverage across the respective surfaces of the individual cells 110. In a preferred embodiment, at least one first assembly air inlet 103A provides air directly to the first battery assembly 500 and at least one second assembly air inlet 103B provides air directly to the second battery assembly 600.

Within the primary cooling cavity 101, at least one interior air inlet 106 adjoins each battery assembly 500 and 600. As air flows through the primary cooling cavity 101, air is forced through the interior air inlets 106 to provide air flow to contact with the electrochemical cells 110, which comprise the battery assemblies 500 and 600. Preferably, the air inlets 106 are evenly spaced and positioned between individual electrochemical cells 110. After the air flows through the electrochemical cells 110 of the battery assemblies 500 and 600, air exits through interior air outlets 102 into the diverging air flow paths 112A and 112B. As the air flows into the diverging air flow paths 112A and 112B, the air flow is forced to the outlet manifold 119. The distance between the first battery assembly 500 and the base 108 expands as air flows from the primary air inlet 104 and secondary air inlets 103A and 103B to air outlet 107. Similarly, the distance between the second battery assembly 600 and the lid 114 expands as air flows from the primary air inlet 104 and secondary air inlets 103A and 103B to air outlet 107. This configuration allows the space available to accommodate the increasing temperature of the air as it flows through the battery pack 100. As the volume of air increases, more space is available to allow even flow and prohibit the formation of air pockets.

Referring to FIGS. 1, 2A and 2B, a baffle 105 may be positioned in each of the battery assemblies 500 and 600 to regulate air from the secondary air inlets 103A and 103B into contact with the electrochemical cells 110. The cells closest the secondary air inlets 103A and 103B may retain heat if no bleed in air flow is incorporated. The baffle 105, which may be disposed proximate to each of the secondary 103A and 103B air inlets, prevents the air from directly hitting the respective electrochemical cell 110 closest in proximity to each the secondary air inlets 103A and 103B. Further, the baffles 105 guide the air into the cavities between the cells 110, to allow for the maximum amount of surface area coverage with the coolant across the individual cells 110. The baffle 105 and secondary air inlets 103A and 103B ensure that the cells 110 at the secondary air inlet regions are neither overcooled due to air impingement nor overheated due to lack of air flow. The cell assemblies 500 and 600 preferably have the electrochemical cells 110 arranged in a staggered arrangement. The staggered arrangement allows the air to flow uniformly through the stacks of cells and prevents inhibition of the air flow as the air winds through the cell stacks from the front 117 to the rear 118. Also, the staggered arrangement provides the opportunity for optimization of the cell spacing to prevent choking the flow of air in the central and rear regions of the battery pack.

Figure 3:
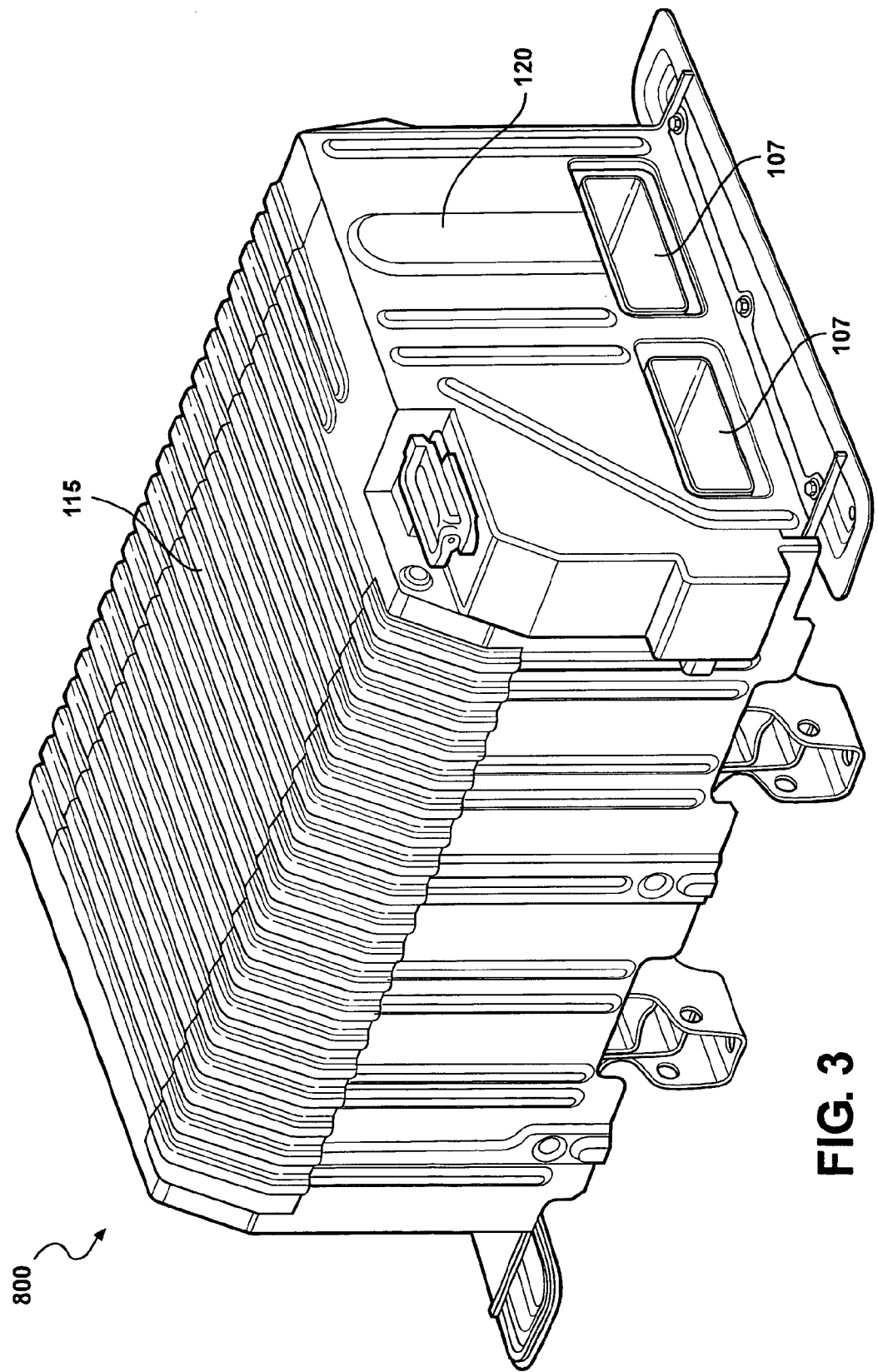
FIG. 3 is a side perspective view of an embodiment of a battery pack of the present invention, wherein two primary air outlets are illustrated.
Figure 4:
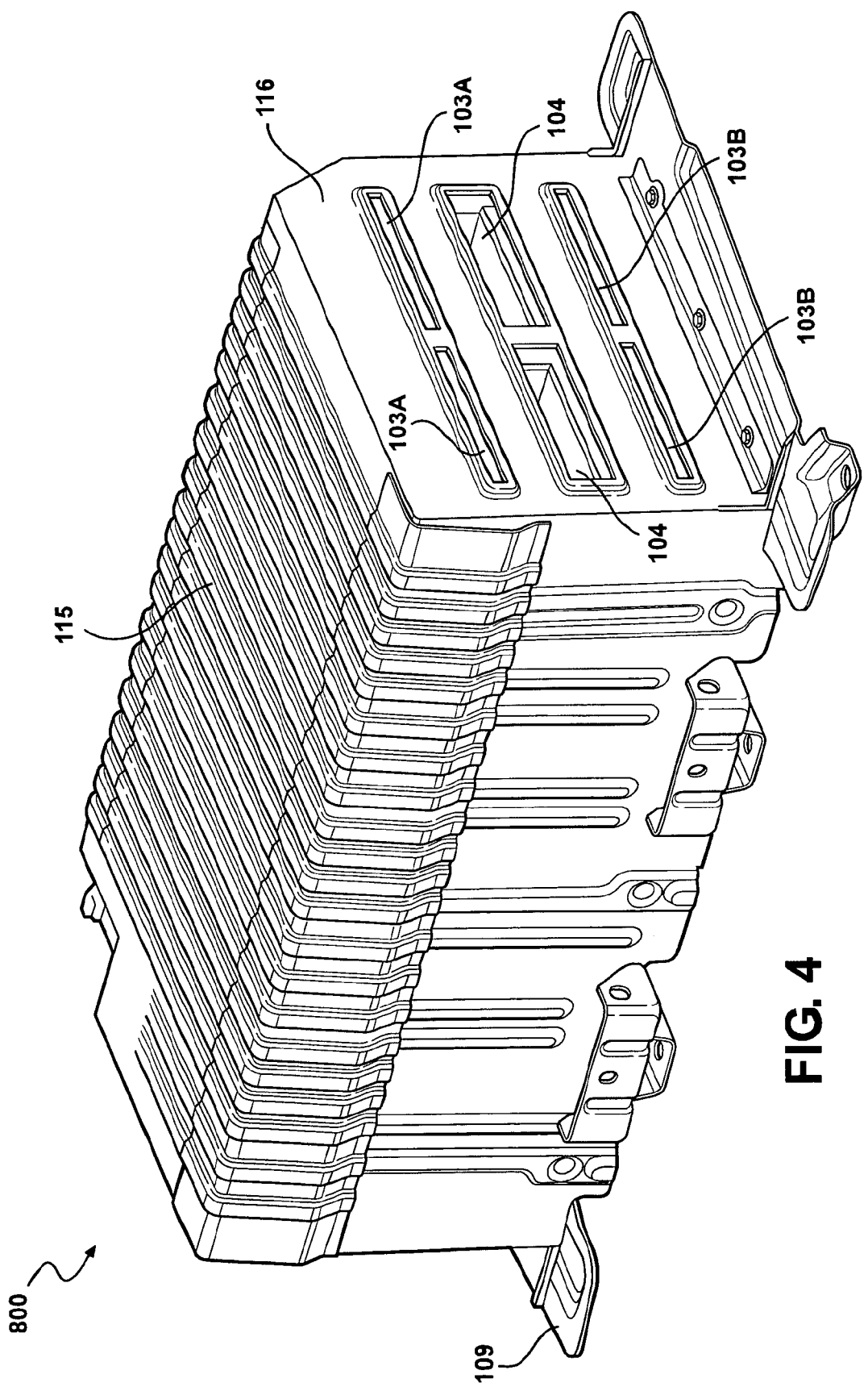
FIG. 4 is a side perspective view of an embodiment of a battery pack of the present invention, wherein two primary air inlets and four secondary air inlets are illustrated.

Referring to FIGS. 3 and 4, a battery system of the present invention, generally referred to as 800, is illustrated. The battery system may include a system cover 115 and a housing bracket 109. Referring to FIG. 3, the primary air outlets 107 extend through the rear panel 120, which may be secured to the system cover 115. Referring to FIG. 4, the primary air inlets 104 and the secondary air inlets 103A and 103B extend through the front panel 116, which may be secured to the system cover 115.

Figure 5:
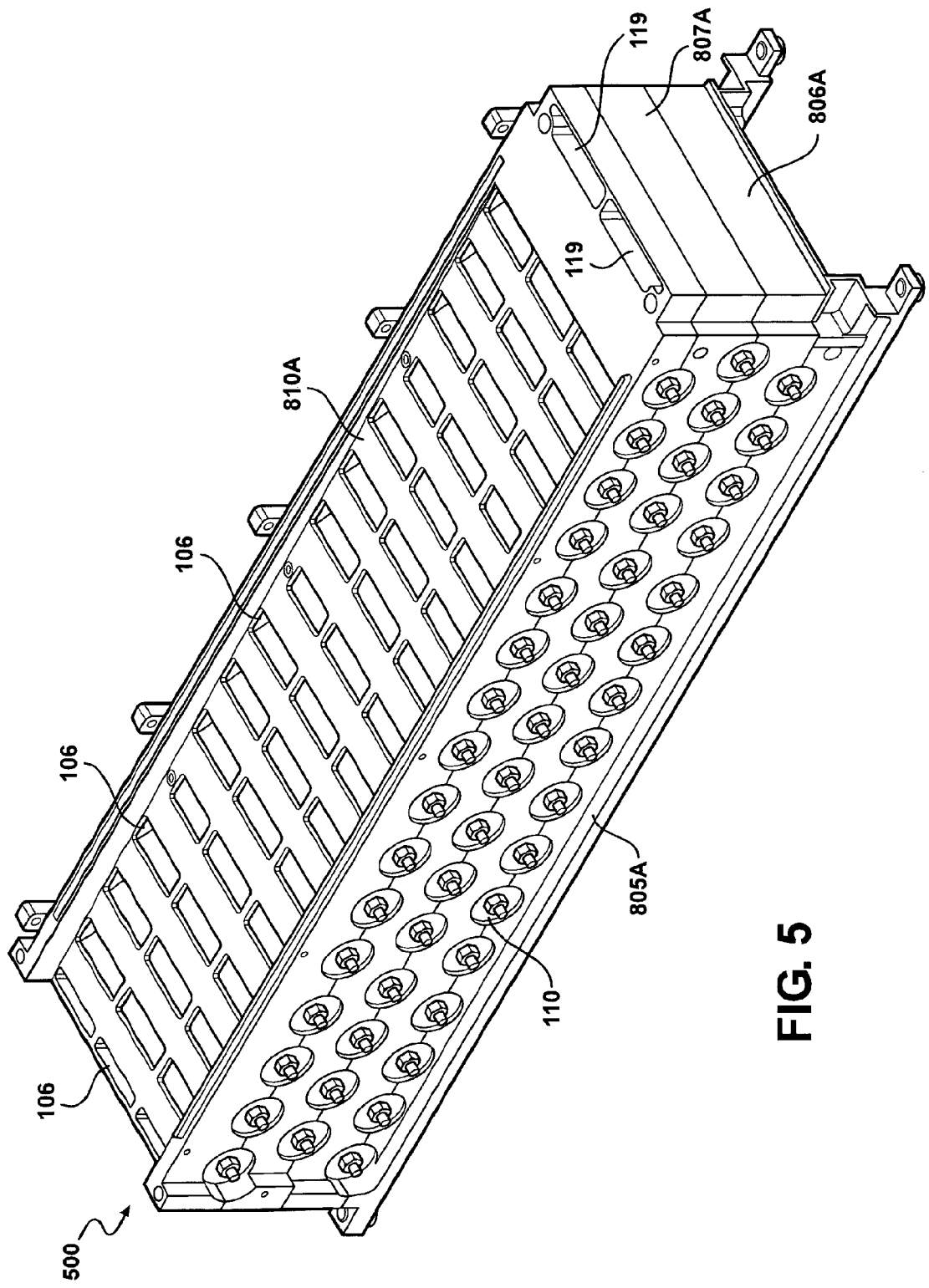
FIG. 5 is a side perspective view of an embodiment of a battery pack of the present invention, wherein the battery cells are assembled in a manner in accordance with the present invention and interior air inlets are illustrated.

Referring to a preferred embodiment of the present invention in FIG. 5, a first battery assembly, referred to generally as 500, is illustrated. The first battery assembly 500 is arranged within a housing, wherein the first battery assembly 500 is set upon a first axis 5-5 forming an angle acute to the base edge of the base tray 805A relative to the front 116, which forms a diverging air flow path 112A. The first axis of the first battery assembly 500 also forms an angle acute to the cavity edge of the upper cavity support 810A relative to the rear 118. The electrochemical cells 110 may be set into accommodating spaces formed between the base tray 805A and lower cavity support 810A. To accommodate additional rows of cells 110, the assembly 500 may further include lower mid-supports 806A and 807A. As the base tray 805A, lower mid-supports 806A and 807A and lower cavity support 810A stack upon one another, the lower portion of the outlet manifold 119 is formed in the rear of the assembly 500.

Figure 6:
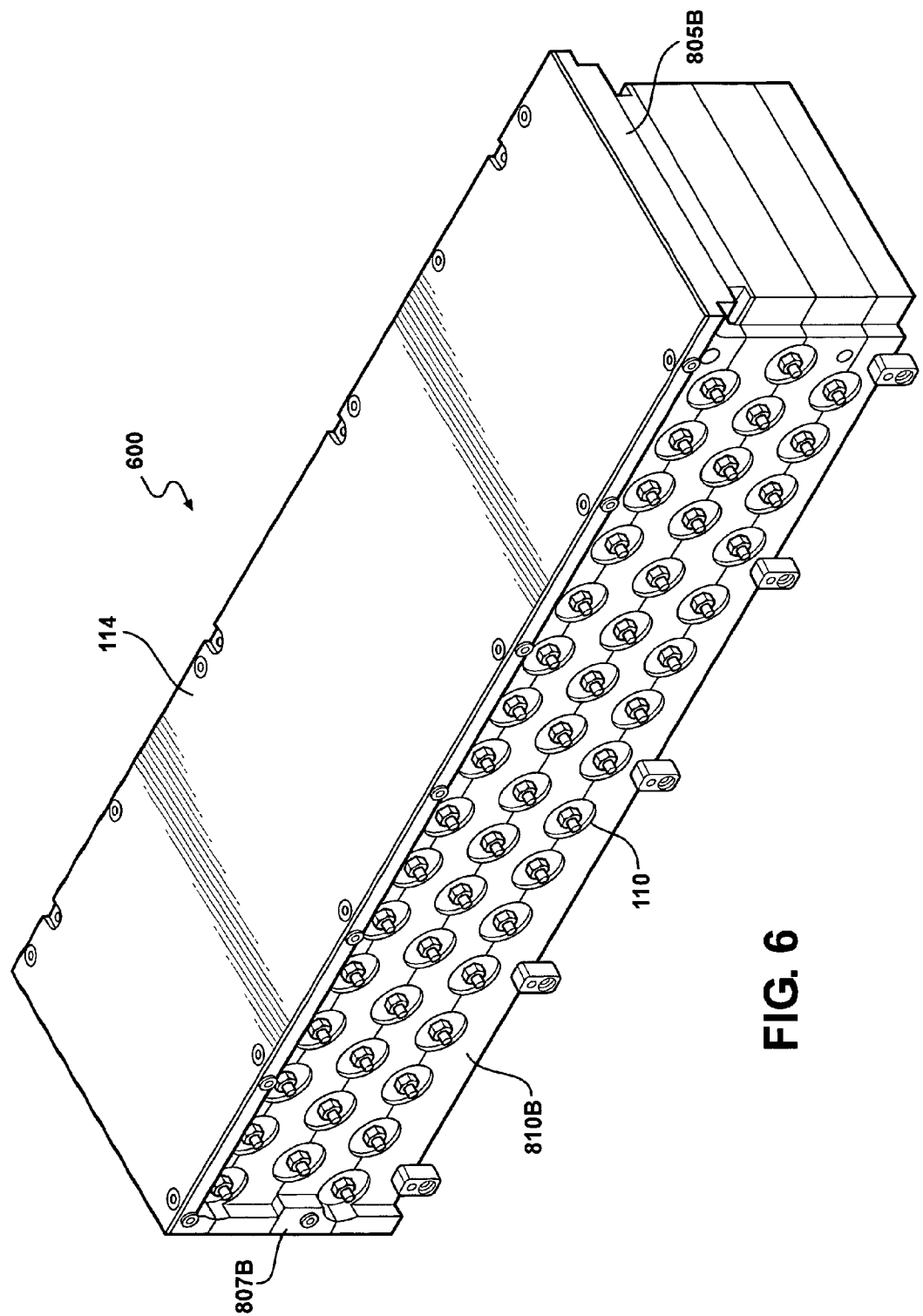
FIG. 6 is a side perspective view of an embodiment of a battery pack of the present invention, wherein the battery cells are assembled in a manner in accordance with the present invention and a base is illustrated.

Referring to a preferred embodiment of the present invention in FIG. 6, a first battery assembly, referred to generally as 600, is illustrated. The second battery assembly 600 is arranged within a housing, wherein the second battery assembly 600 is set upon a second axis 6-6 forming an angle acute to the cavity edge of the upper cavity support 810B relative to the rear 118. The second axis also forms an angle acute to the lid side of the lid tray 805B relative to the front 117, which forms a diverging air flow path 112B. The electrochemical cells 110 may be set into accommodating spaces formed between the lid tray 805B and upper cavity support 810B. To accommodate additional rows of cells 110, the assembly 600 may further include upper mid-supports 806B and 807B. As the lid tray 805B, upper mid-supports 806B and 807B and upper cavity support 810B stack upon one another, the upper portion of the outlet manifold 119 is formed in the rear of the assembly 500. Each of the diverging air flow paths 112A and 112B feeds to the outlet manifold 119, which is in flow communication with the primary air outlets 107.

Figure 7:
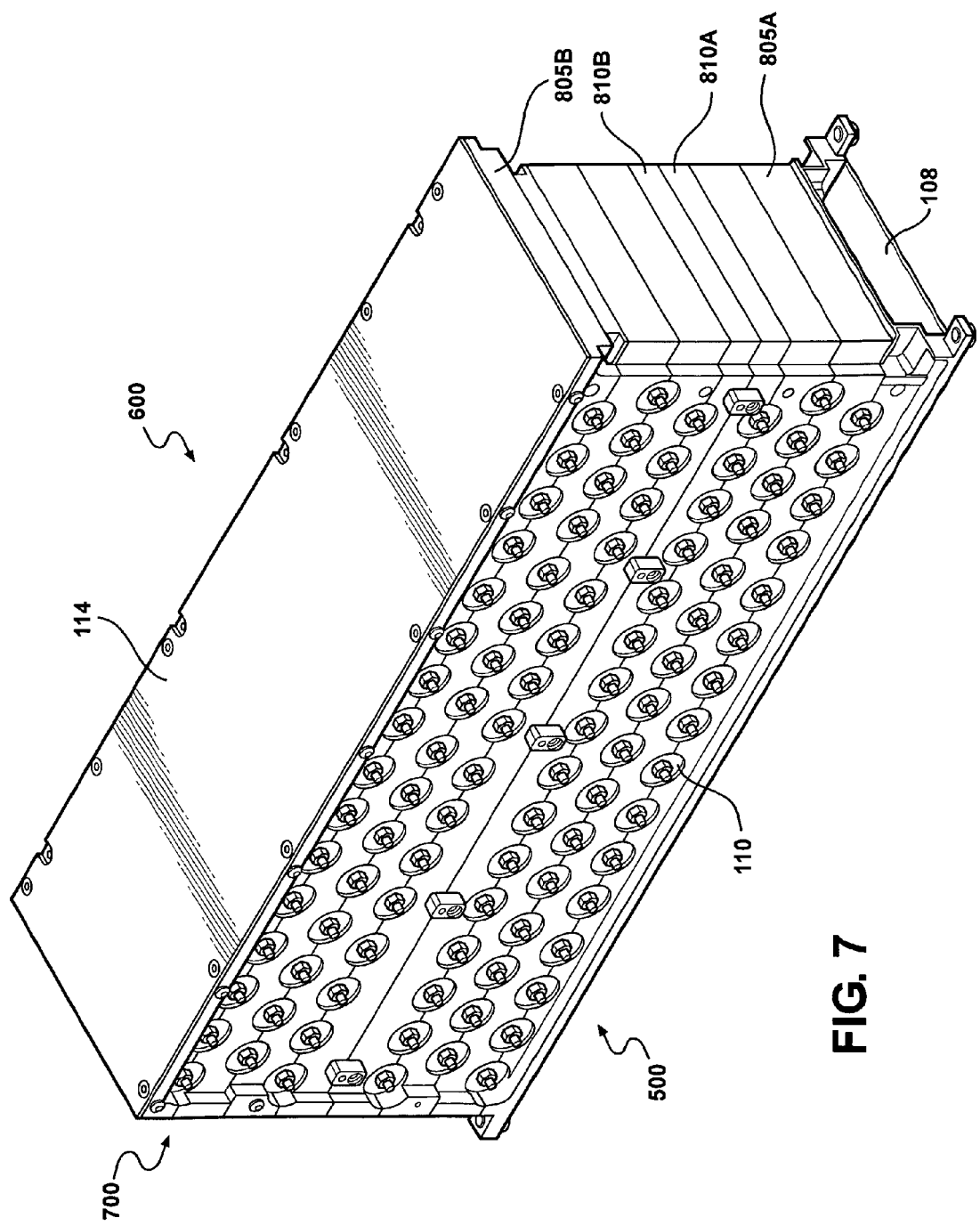
FIG. 7 is a side perspective view of an embodiment of a battery pack of the present invention, wherein a first battery assembly and a second battery assembly are adjoined to form a battery pack having a primary cooling cavity.
Figure 8:
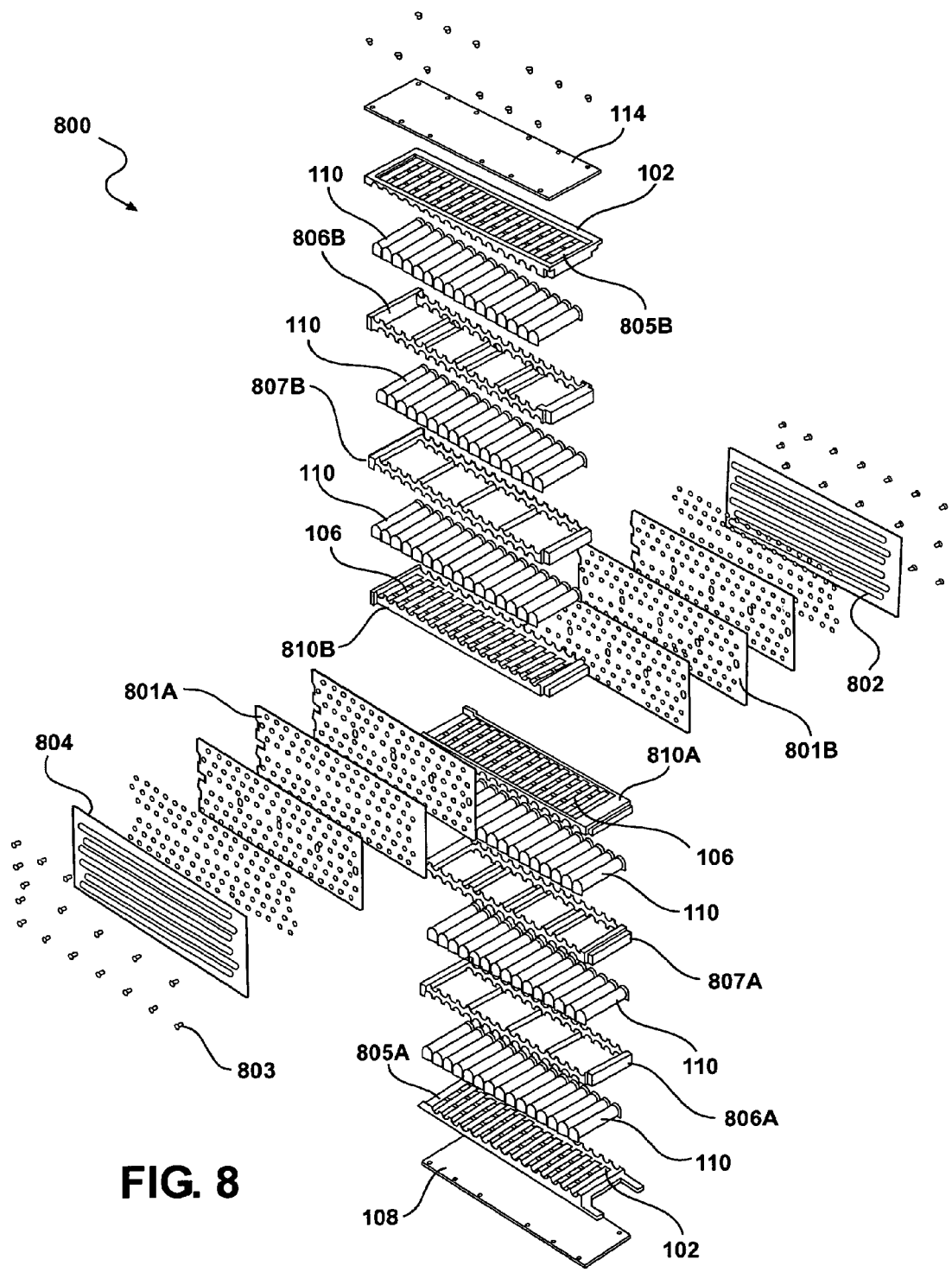
FIG. 8 is an exploded view of FIG. 7.

Referring to FIG. 7, a battery pack of the present invention, generally referred to as 700, comprises first and second battery assemblies 500 and 600. As the assemblies 500 and 600 are adjoined, the lower cavity support 810A and upper cavity support 810B mate to form the primary cooling cavity 110. FIG. 8 is an exploded view of FIG. 7. The battery pack may further include absorbent mats 808A and 808B, 809A and 809B. Absorbent mats which may be incorporated into the present invention are described in U.S. patent application Ser. No. 11/820,272 entitled "BATTERY ASSEMBLY INCLUDING AN ELECTROLYTE MANAGEMENT SYSTEM" and filed on Jun. 19, 2007, which is whereby incorporated herein by reference. The battery pack may further include at least one electronics board 801A in electrical and data communication with each of the electrochemical cells. The electronics board 801A collects and transmits status information, such as temperature, state of charge and voltage, to a master control module (not shown). Also, the electronics board 801A transmits electrical current from the electrochemical cells 110 to a current collector (not shown).

Figure 9:
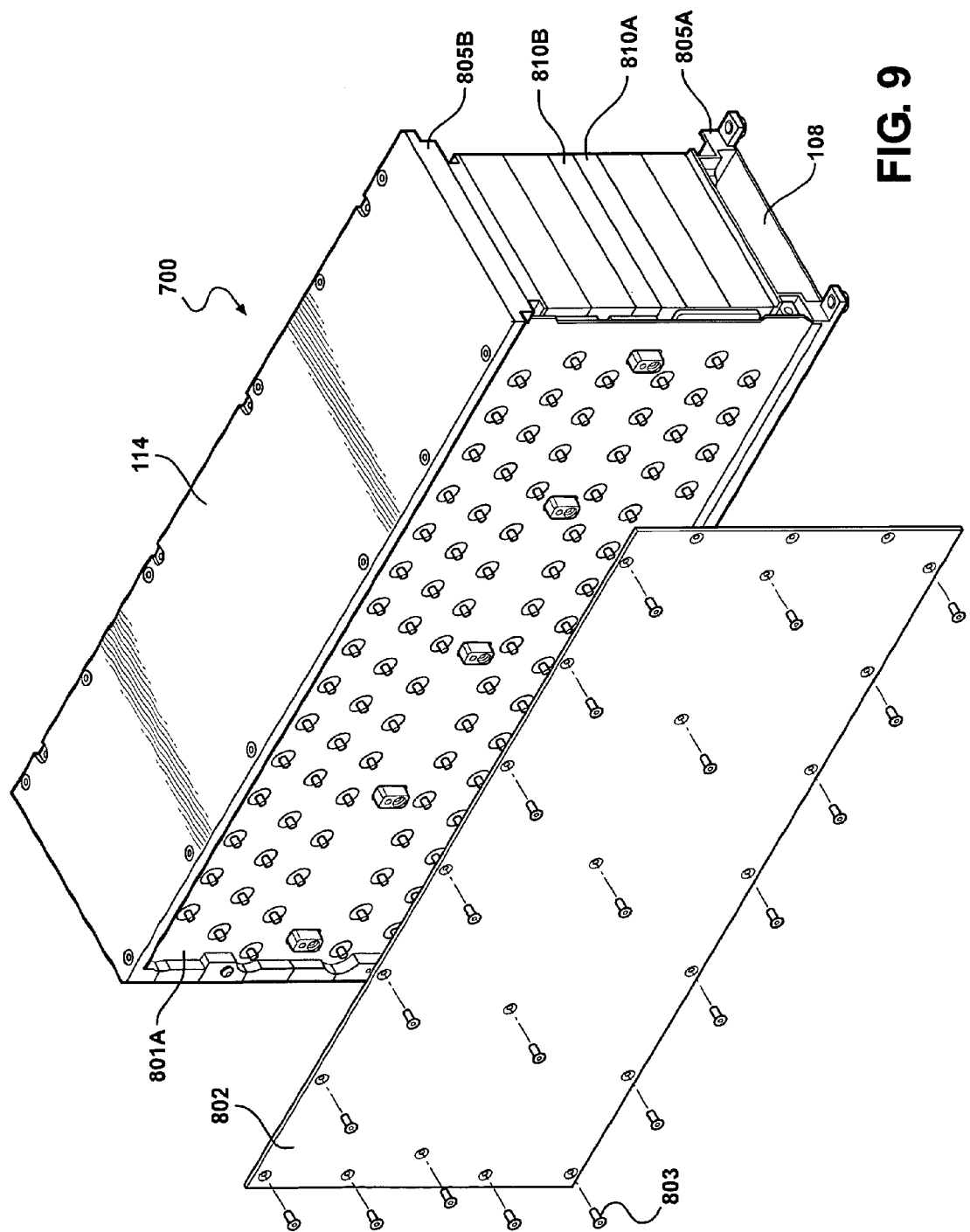
FIG. 9 is a side perspective view of an embodiment of a battery pack of the present invention, wherein a first battery assembly and a second battery assembly are adjoined to form a battery pack having a primary cooling cavity and an electronics board is secured to the cell terminals.
Figure 10:
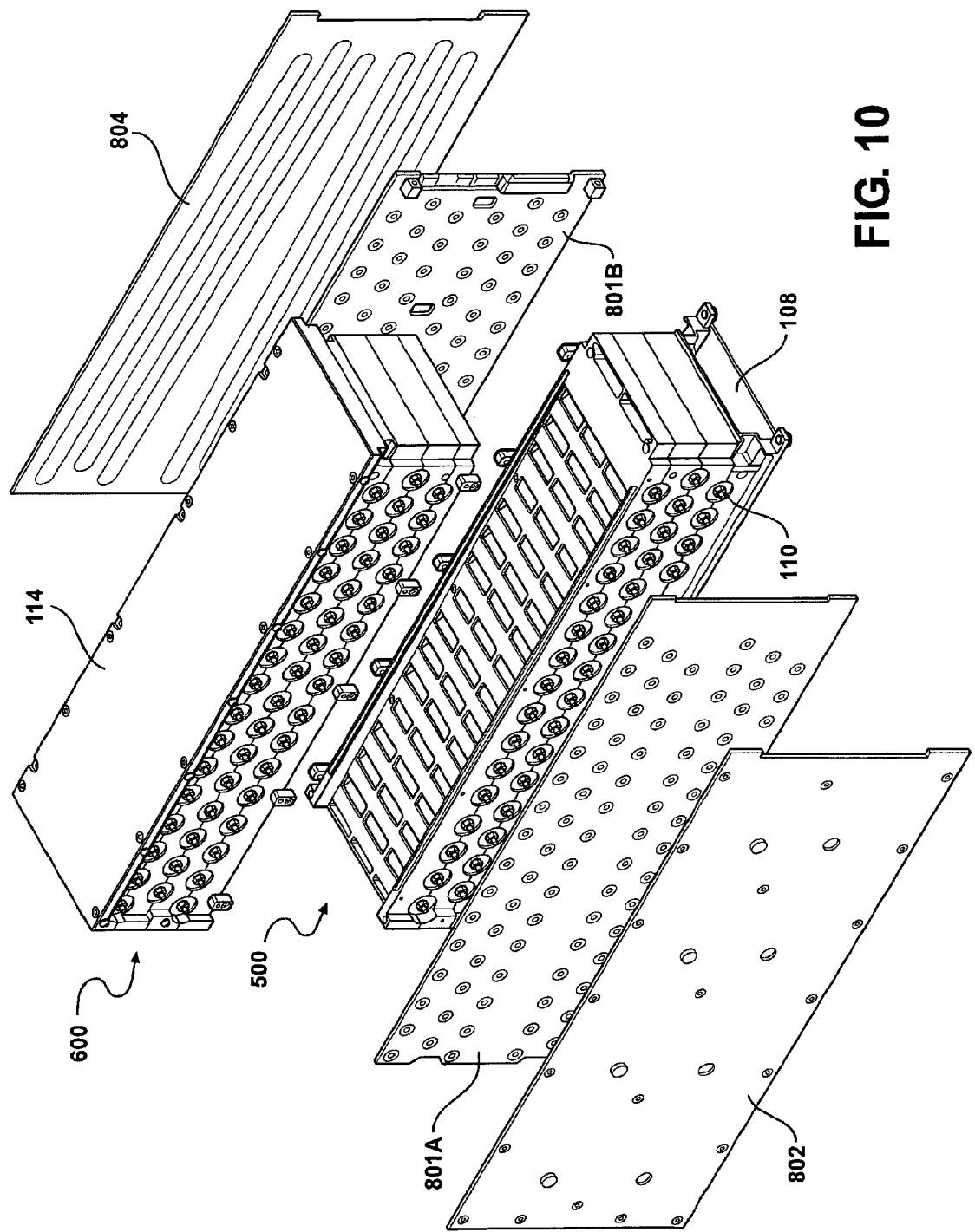
FIG. 10 is an exploded view of FIG. 9.

FIG. 9 is a side perspective view of an embodiment of a battery pack 700 of the present invention, wherein a first battery assembly 500 and a second battery assembly 600 are adjoined to form a battery pack having converging air flow path and an electronics board 801A is secured to the cell 110 terminals. FIG. 10 is an exploded view of FIG. 9. As the assemblies 500 and 600 are adjoined, the lower cavity support 810A and upper cavity support 810B mate to form the primary cooling cavity 110. A first electronics board 801A may be secured to the terminal side of the electrochemical cells 110 and a second electronics board 801B may be secured to the opposing side of the electrochemical cells 110. An outside side panel 802 secures the first electronics board 801A to the battery pack 700 and an inside panel 804 secures the second electronics board 801B to the battery pack 700. Any appropriate securing mechanism may be incorporates, such as screws 803.

Figure 11:
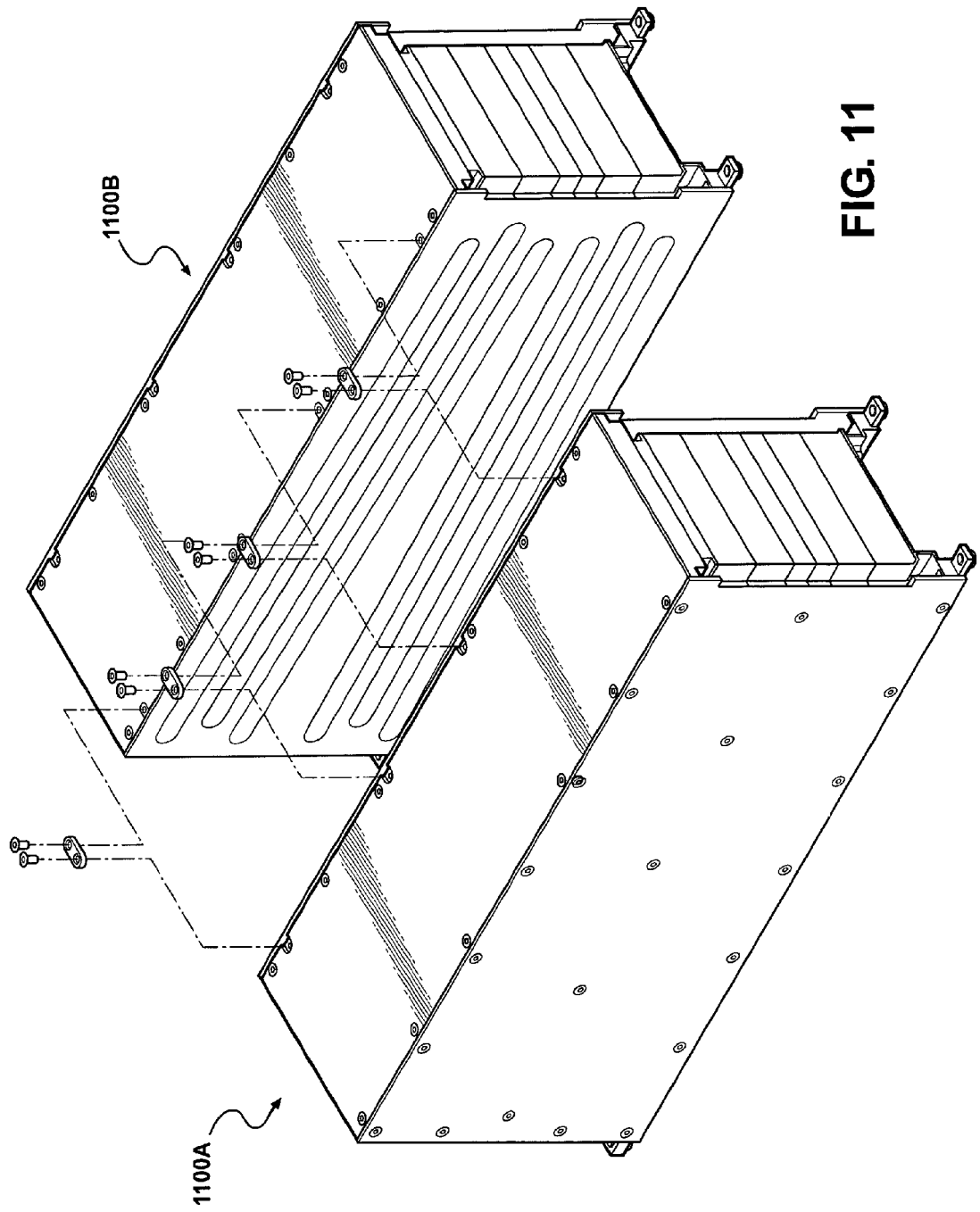
FIG. 11 is a side perspective view of an embodiment of a battery system of the present invention, wherein a first battery pack and a second battery pack are adjoined to form a battery system.
Figure 12:
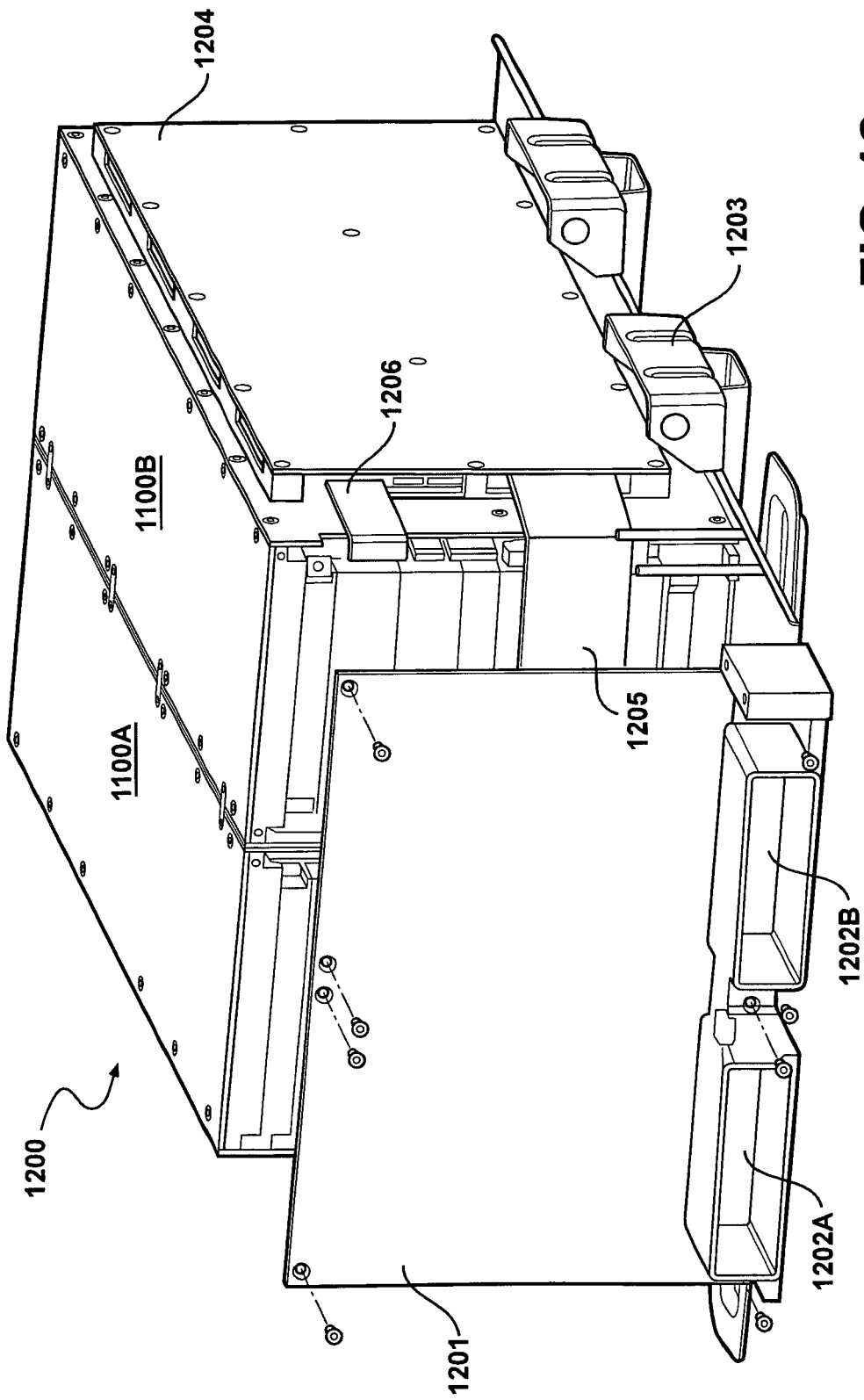
FIG. 12 is a side perspective view of an embodiment of a battery system of the present invention, wherein a battery system has a primary air outlet cover.

FIG. 11 is a side perspective view of an embodiment of a battery system of the present invention, wherein a first battery pack 1100A and a second battery pack 1100B are adjoined to form a battery system. Any number of battery packs may be adjoined and interconnected to meet the power needs of a given application. FIG. 12 is a side perspective view of an embodiment of a battery system 1200 of the present invention, wherein a battery system 1200 has a primary air outlet panel 1201 having first and second panel outlets 1202A and 1202B. The battery system 1200 may be secured to a bracket 1203, wherein the bracket 1203 is designed to fit into a specified space for a specific application. An auxiliary board 1204 may be incorporated for support and protection of the electronics board, temperature sensor ribbon cable 1205 and voltage sense wires 1206.

Preferably the battery pack of the present invention uses forced air to cool the various components, including electrochemical cells, of the battery pack. Conditioned air enters from the cabin into each of the two inlet manifolds built symmetrically in the pack and sucked out through the exhausts through two outlet manifolds which are ducted to the atmosphere thus eliminating build up of hydrogen in case of leakages.

Although this invention describes cooling of the electrochemical cells by air, it is understood that air includes conditioned air or any other cooling medium. It should be appreciated that other cooling gases or fluids may be used in addition to or instead of air.

Figure 13:
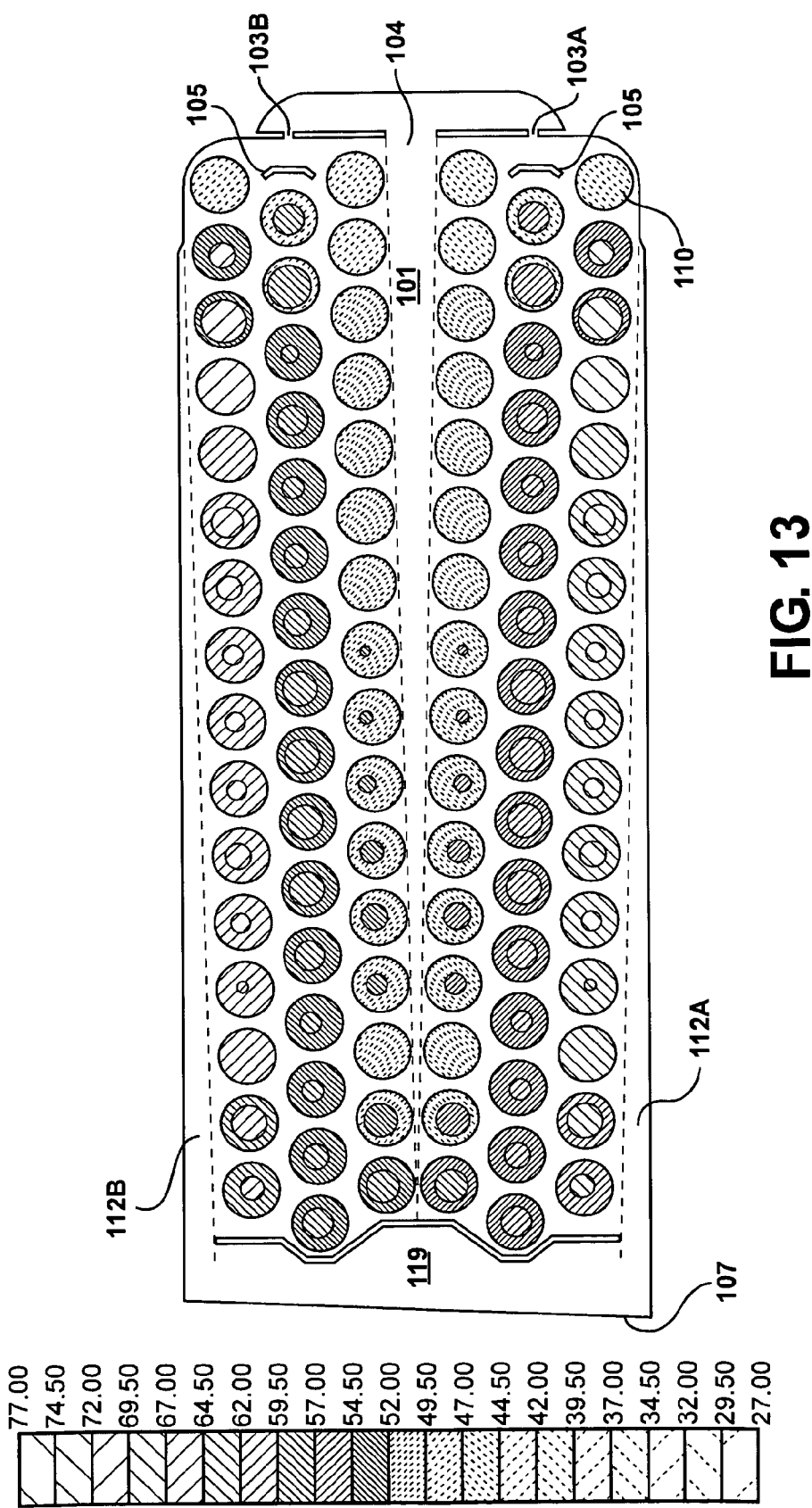
FIG. 13 is a thermal imaging model of a preferred embodiment of the present invention.

As illustrated in FIG. 13, the present invention provides optimal temperature distribution throughout the battery pack. FIG. 13 provides thermal modeling of a preferred embodiment of the present invention and provides the temperature in ° C. The embodiment shown provides 192 cylindrical lithium cells arranged according to the embodiment in FIGS. 11 and 12. As seen in FIG. 13, the respective baffles 105 positioned immediately inside the secondary air inlets 103A and 103B ensure that the cells 110 at the inlet region are neither overcooled due coolant impingement not overheated due to lack of coolant flow. Further, the converging arrangement ensures that the air flow accelerates as it progresses through the battery pack. As a result, in spite of the fact that the air gains heat as it moves from the primary inlet 104 and secondary inlets 103A and 103B to the outlet manifold 119 and the primary air outlet 107, the acceleration due to the tapering effect of the primary cooling cavity 101 enables efficient cooling of cells 110 throughout the battery pack, particularly at the central and outlet regions.

Figure 14:
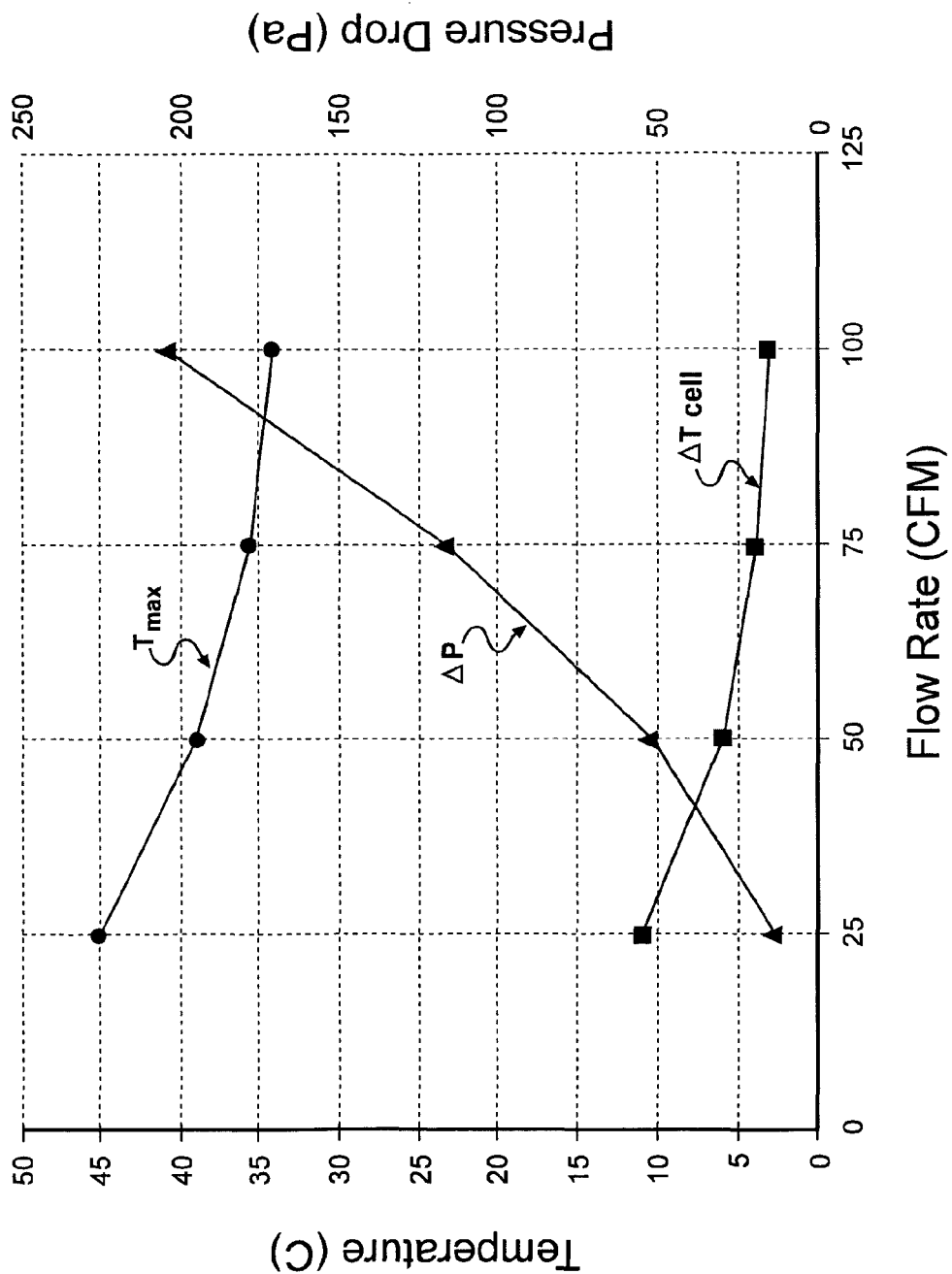
FIG. 14 is a graph which illustrates the effect of variation of flow rate on $\Delta P$, $T_{max}$ and $\Delta T_{cell}$.

Referring to FIG. 14, the graph illustrates the effect of variation of flow rate on $\Delta P$, $T_{max}$ and $\Delta T_{cell}$ in a battery pack of the present invention. At low flow rates, i.e. 25 and 50 CFM, the pressure drops are very low. However, in both of these cases the $\Delta T_{cell} > 5°$ C. is not optimal. The highest flow rate of 100 CFM gives the lowest $\Delta T_{cell}$ and $T_{max}$ values however the associated pressure penalty is very high (~205 Pa). For a flow rate of 75 CFM, the $\Delta T_{cell}$ is $<5°$ C. and the pressure drop value even though high is optimal. Also to note that increasing flow rate from 75 to 100 CFM increases the pressure drop by 42% while contributing to only a 1° C. reduction in $\Delta T_{cell}$ and $T_{max}$. Preferably, 75 CFM is the optimal operating flow rate for this system and furthermore, increasing the flow rate beyond 75 CFM will not yield much in terms of thermal behavior but will significantly affect the pressure drop.

An embodiment of the present invention provides a method for cooling a battery pack having a first and second battery assembly. The method comprises providing a housing having a front wall, a rear wall, a base and a lid; disposing the first battery assembly within the housing, wherein the first battery assembly is set upon a first axis forming an angle acute to the base; disposing the second battery assembly within the housing, wherein the second battery assembly is set upon a second axis forming an angle acute to the lid; forming a primary cooling cavity between the first and second battery assemblies; forming a primary air inlet in the front wall, wherein the primary air inlet is in flow communication with the primary cooling cavity; forming at least one air outlet set into the rear wall, wherein the primary cooling cavity comprises a converging air flow path from the front wall to the rear wall; dispersing an air flow through the primary air inlet and into to the primary cooling cavity; and converging the air flow, wherein the converging accelerates the air flow through the first battery assembly and the second battery assembly.

The method may further include forming a first diverging air flow path between the base and the first battery assembly; and forming a second diverging air flow path between the lid and the second battery assembly. The method may further include forming at least one first assembly air inlet in the front wall, wherein the first assembly air inlet provides air directly to the first battery assembly; and forming at least one second assembly air inlet in the front wall, wherein the second assembly air inlet provides air to the second battery assembly.

The method may further include dispersing at least one row of electrochemical cells into each of the first and second battery assemblies. The method may further include forming an outlet manifold within the housing, wherein the outlet manifold is in flow communication with each of the primary air outlets. The method may further include regulating the air flow from the first assembly air inlets into contact with the electrochemical cells of the first battery assembly; and regulating the air flow from the second assembly air inlets into contact with the electrochemical cells of the second battery assembly.

While the invention has been illustrated in detail in the drawings and the foregoing description, the same is to be considered as illustrative and not restrictive in character as the present invention and the concepts herein may be applied to any battery pack or battery system. It will be apparent to those skilled in the art that variations and modifications of the present invention can be made without departing from the scope or spirit of the invention. Thus, it is intended that the present invention cover all such modifications and variations of the invention that come within the scope of the appended claims and their equivalents.

We claim:

1. A battery pack comprising:
   a housing having a base and a lid, a front wall, and a rear wall;
   a first battery assembly arranged within said housing, said first battery assembly set upon a first axis forming an angle acute to said base;
   a second battery assembly arranged within said housing, said second battery assembly set upon a second axis forming an angle acute to said lid forming a primary cooling cavity between said first and second battery assemblies;
   a primary air inlet arranged in said front wall;
   at least one air outlet arranged in said rear wall, wherein a width of said primary cooling cavity decreases from said front wall to said rear wall;
   a first diverging air flow path between said base and said first battery assembly, wherein a width of said first diverging air flow path increases from said front wall to said rear wall; and
   a second diverging air flow path between said lid and said second battery assembly, wherein a width of said second diverging air flow path increases from said front wall to said rear wall.

2. The battery pack of claim 1, further comprising at least one secondary air inlet set into said front wall.

3. The battery pack of claim 1, wherein said primary air inlet provides air between said first and second battery assemblies.

4. The battery pack of claim 2, said at least one secondary air inlet comprising a first assembly air inlet and a second assembly air inlet, wherein said first assembly air inlet provides air directly to said first battery assembly and said second assembly air inlet provides air to said second battery assembly.

5. The battery pack of claim 1, each of said first and second battery assemblies comprising at least one row of electrochemical cells.

6. The battery pack of claim 1, each of said first and second battery assemblies comprising a plurality of rows of battery cells.

7. The battery pack of claim 1, said housing further comprising an outlet manifold in flow communication with said at least one air outlet.

8. The battery pack of claim 4, further comprising;
   at least one first baffle disposed proximate to the first assembly air inlet in the first battery assembly; and
   at least one second baffle disposed proximate to the second assembly air inlet in the second battery assembly.

9. A battery pack comprising:
   a first battery assembly comprising a row of electrochemical cells dispersed between a base tray and a lower cavity support;
   a second battery assembly comprising a row of electrochemical cells dispersed between a lid tray and a upper cavity support, wherein the first battery assembly and second battery assembly mate to form a primary cooling cavity between the lower cavity support and the upper cavity support, wherein respective first ends of said first battery assembly and said second battery assembly are spaced further apart than respective second ends of said first battery assembly and said second battery assembly such that a distance between said first battery assembly and said second battery assembly decreases from said first ends to said second ends and a width of the primary cooling cavity formed between said first battery assembly and said second battery assembly decreases from said first ends of the first and second battery assemblies to said second ends of the first and second battery assemblies;
   a base, wherein said base is secured to said base tray forming a first diverging air flow path between the base and the base tray; and
   a lid, wherein said lid is secured to said lid tray forming a second diverging air flow path between the lid and the lid tray.

10. The battery pack of claim 9, said lower cavity support having at least one interior air inlet and said upper cavity support having at least one interior air inlet.

11. The battery pack of claim 9, said primary cooling cavity comprising a converging air flow path.

12. The battery pack of claim 9, further comprising
    at least one lower mid-support set between said base tray and said lower cavity support; and
    at least one upper mid-support set between said lid tray and said upper cavity support.

13. The battery pack of claim 9, further comprising an outlet manifold in flow communication with each of said first diverging air flow path and said second diverging air flow path.

14. The battery pack of claim 13, said outlet manifold in flow communication with at least one primary air outlet.

15. The battery pack of claim 11, further comprising;
    at least one primary air inlet in flow communication with said primary cooling cavity;
    at least one first secondary air inlet in flow communication with said first battery assembly; and
    at least one second secondary air inlet in flow communication with said second battery assembly.

16. A method for cooling a battery pack having a first and second battery assembly, comprising:
    providing a housing having a front wall, a rear wall, a base and a lid;
    disposing said first battery assembly within said housing, said first battery assembly set upon a first axis forming an angle acute to said base; and
    disposing said second battery assembly arranged within said housing, said second battery assembly set upon a second axis forming an angle acute to said lid;
    forming a primary cooling cavity between said first and second battery assemblies, wherein respective first ends of said first battery assembly and said second battery assembly are spaced further apart than respective second ends of said first battery assembly and said second battery assembly such that a distance between said first battery assembly and said second battery assembly decreases from said front wall to said rear wall and a width of said primary cooling cavity formed between said first battery assembly and said second battery assembly decreases from said front wall to said rear wall;
    forming a primary air inlet in said front wall, said primary air inlet in flow communication with said primary cooling cavity;

forming at least one air outlet set into said rear wall, said primary cooling cavity comprising a converging air flow path from said front wall to said rear wall;

dispersing air flow through said primary air inlet into said primary cooling cavity;

converging said air flow, wherein said converging accelerates the air flow through the first battery assembly and the second battery assembly;

forming a first diverging air flow path between said base and said first battery assembly; and forming a second diverging air flow path between said lid and said second battery assembly.

17. The method for cooling the battery pack of claim 16, further comprising:

forming at least one first assembly air inlet in said front wall, said first assembly air inlet providing air directly to said first battery assembly;

forming at least one second assembly air inlet in said front wall, said second assembly air inlet providing air to said second battery assembly.

18. The method for cooling the battery pack of claim 17, further comprising dispersing at least one row of electrochemical cells into each of said first and second battery assemblies.

19. The method for cooling the battery pack of claim 16, further comprising forming an outlet manifold within said housing, said outlet manifold in flow communication with said at least one air outlet.

20. The method for cooling the battery pack of claim 18, further comprising:

regulating the air flow from the first assembly air inlets into contact with the electrochemical cells of the first battery assembly; and regulating the air flow from the second assembly air inlets into contact with the electrochemical cells of the second battery assembly.

* * * * *

UNITED STATES PATENT AND TRADEMARK OFFICE
CERTIFICATE OF CORRECTION

PATENT NO. : 8,455,133 B2
APPLICATION NO. : 12/321977
DATED : June 4, 2013
INVENTOR(S) : Satish Anantharaman et al.

It is certified that error appears in the above-identified patent and that said Letters Patent is hereby corrected as shown below:

In the Specifications
Column 3, Line 12       Delete "of" and insert --on--
Column 3, Line 43       After "into", delete "to"
Column 7, Line 29       Delete "incorporates" and insert --incorporated--
Column 8, Line 42       After "into", delete "to"

In the Claims
Column 10, Line 25, Claim 12    After "comprising", insert --:--
Column 10, Line 49, Claim 16    After "base", delete "and"

Signed and Sealed this
Twentieth Day of August, 2013

Teresa Stanek Rea
*Acting Director of the United States Patent and Trademark Office*